United States Patent [19]

Sanders

[11] Patent Number: 5,017,425
[45] Date of Patent: May 21, 1991

[54] TRICOT KNITTING MACHINE IMPROVEMENT

[75] Inventor: Kenneth H. Sanders, Jonesville, S.C.

[73] Assignee: Milliken Research Corporation, Spartanburg, S.C.

[21] Appl. No.: 551,295

[22] Filed: Jul. 12, 1990

[51] Int. Cl.⁵ .............................. B32B 7/00
[52] U.S. Cl. ...................... 428/253; 428/246; 428/343; 428/354; 428/355
[58] Field of Search .............. 428/253, 343, 354, 355, 428/246

[56] References Cited

U.S. PATENT DOCUMENTS

| | | | |
|---|---|---|---|
| 3,446,038 | 5/1969 | Inui | 66/84 |
| 3,735,812 | 5/1973 | Flavell et al. | 66/104 |
| 3,857,260 | 12/1974 | Zeingenberger et al. | 66/84 |
| 3,864,943 | 2/1975 | Wunner | 66/84 |
| 3,913,355 | 10/1975 | Lindner | 66/83 |
| 4,304,813 | 12/1981 | Elmore | 428/253 |
| 4,388,364 | 6/1983 | Sanders | 428/253 |
| 4,393,114 | 7/1983 | Gillespie | 428/253 |
| 4,398,401 | 8/1983 | Schimko | 66/64 |
| 4,532,099 | 7/1985 | Kaji | 428/253 |
| 4,574,596 | 3/1986 | Engelfried et al. | 66/104 |
| 4,823,564 | 4/1989 | Wunner | 66/84 A |

FOREIGN PATENT DOCUMENTS 2313807 10/1974 Fed. Rep. of Germany.

*Primary Examiner*—James J. Bell
*Attorney, Agent, or Firm*—Earle R. Marden; H. William Petry

[57] ABSTRACT

A pressure sensitive tape employing a tricot knit carrier fabric having a minimum number of weft yarns. The tricot knit carrier fabric being knit on a tricot knitting machine which employs a loop hold down bar to prevent the first three or four courses adjacent the needles of the knitting machine from breaking out when released or cast off the needles.

4 Claims, 5 Drawing Sheets

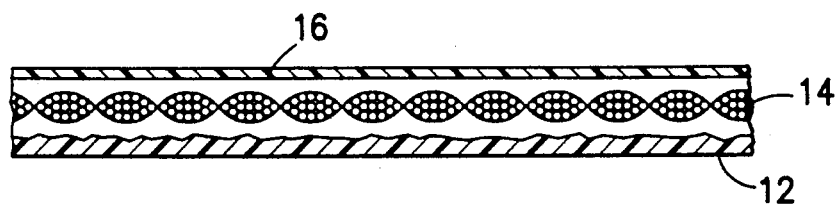
FIG. -1-
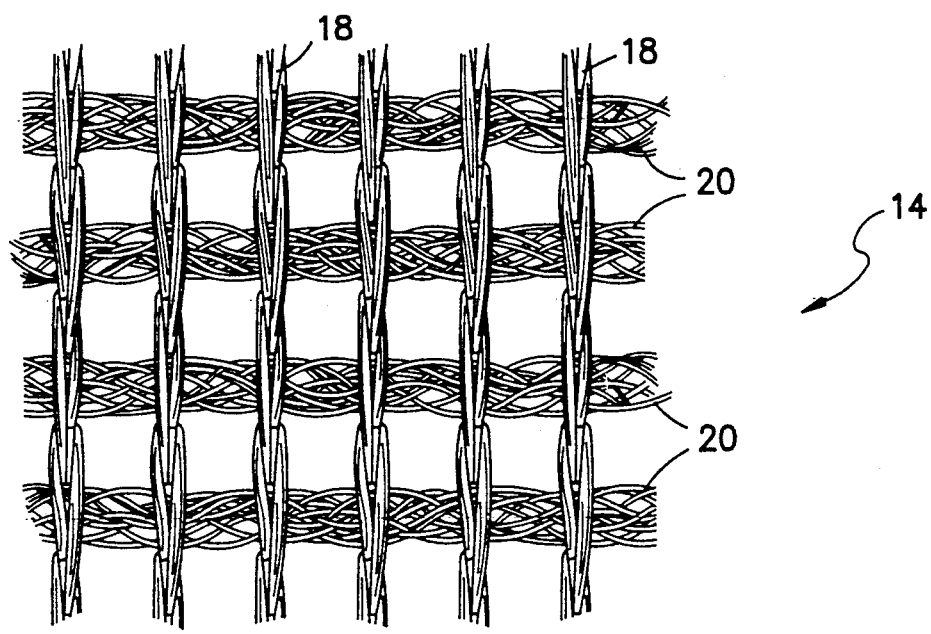
FIG. -2-
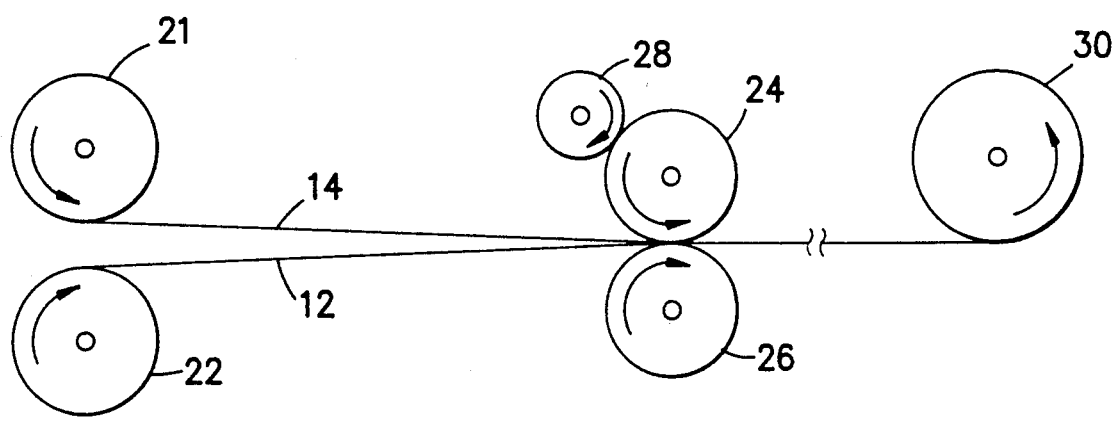
FIG. -3-

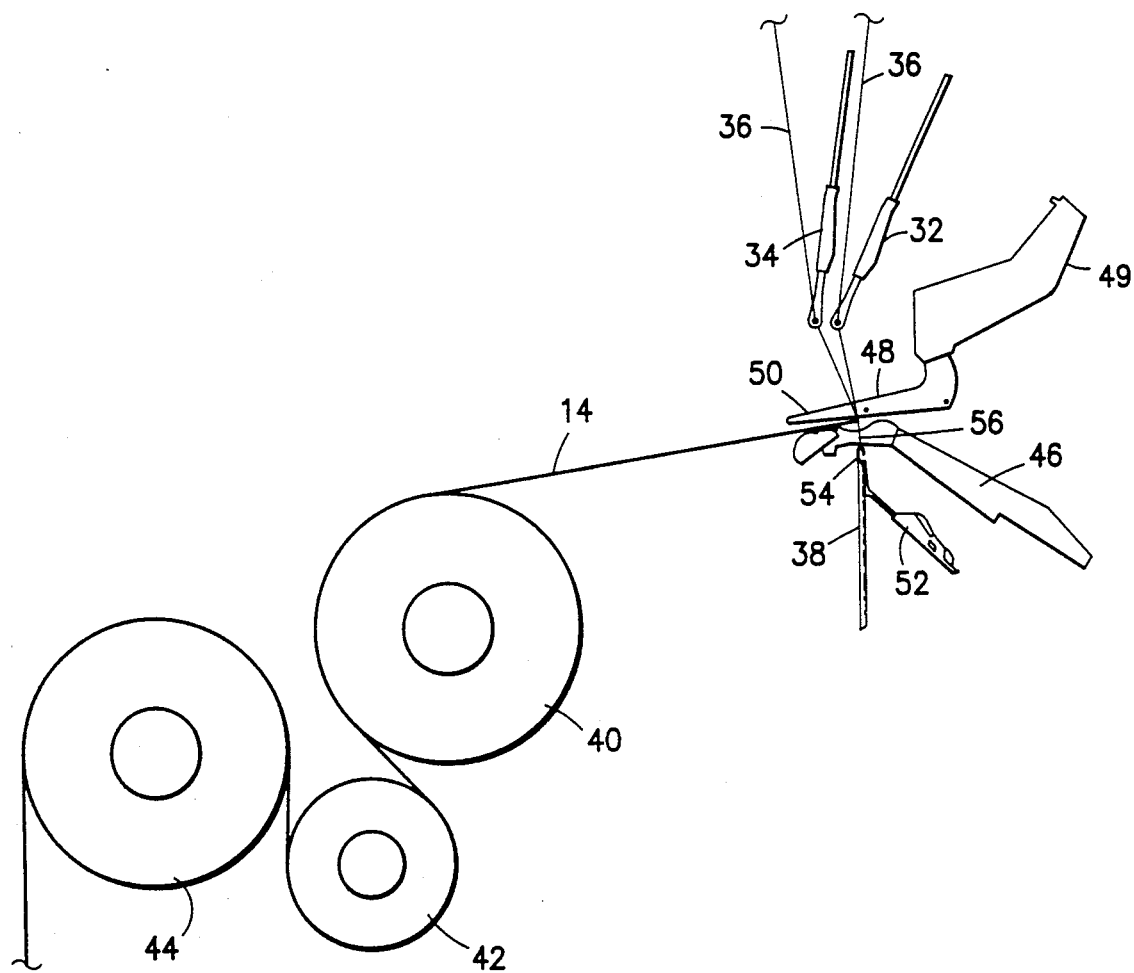
FIG. —4—

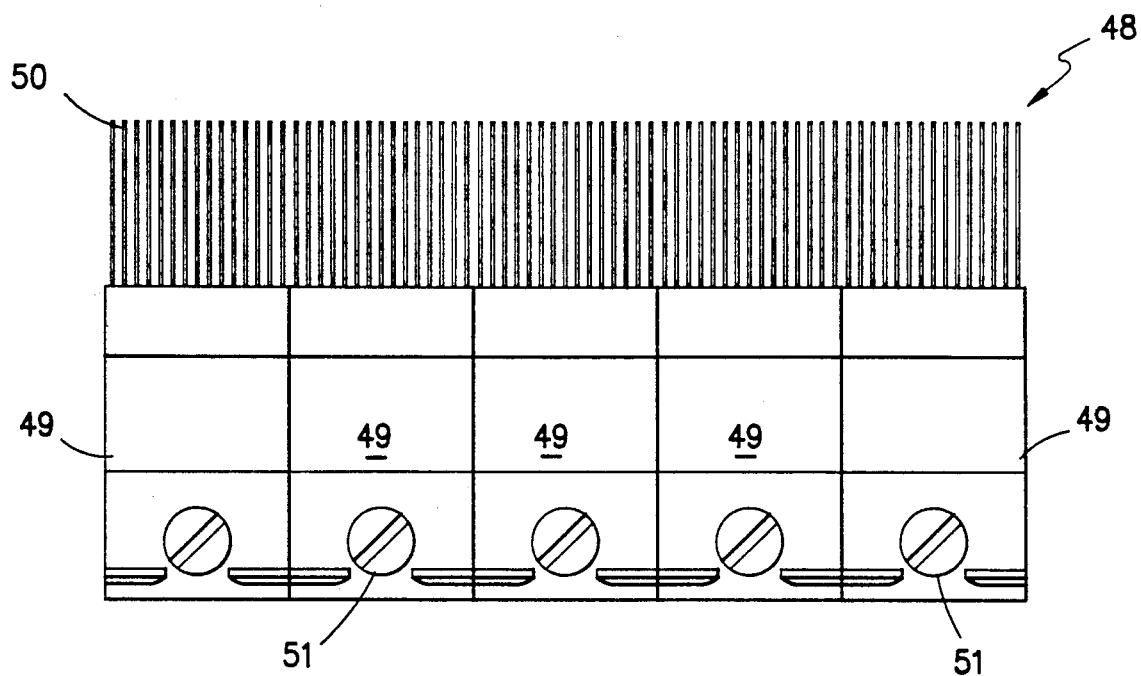
FIG. -5-
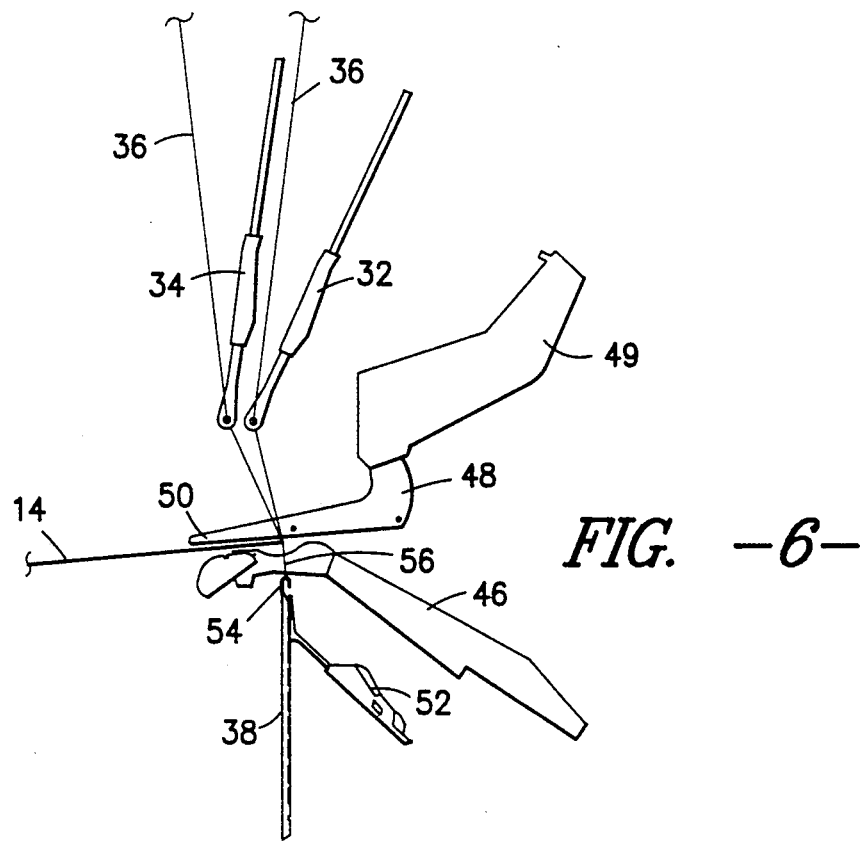
FIG. -6-

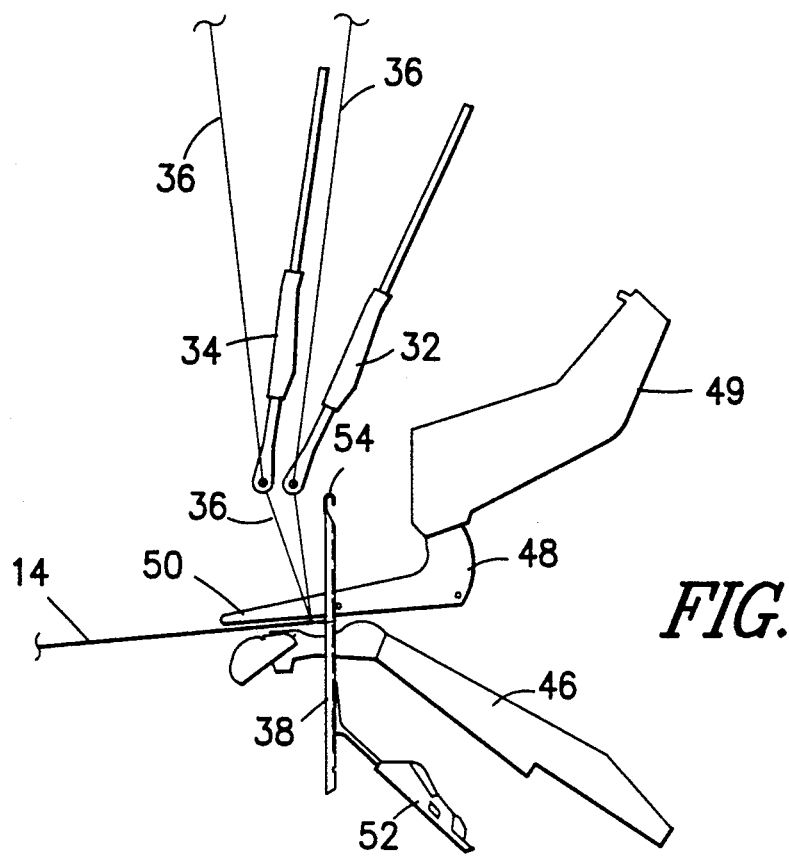
FIG. -7-
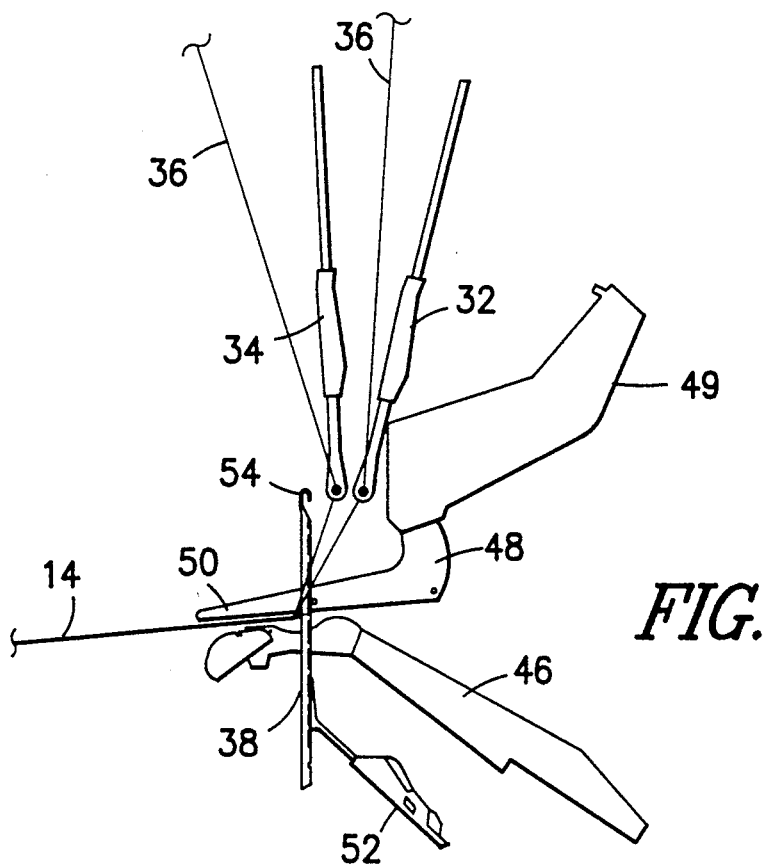
FIG. -8-

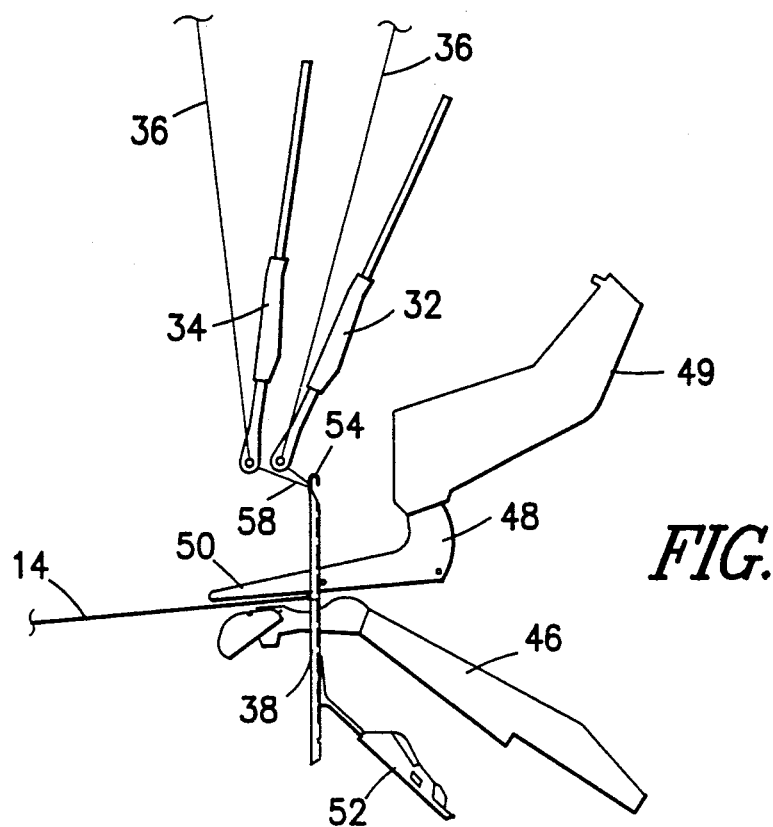
FIG. -9-
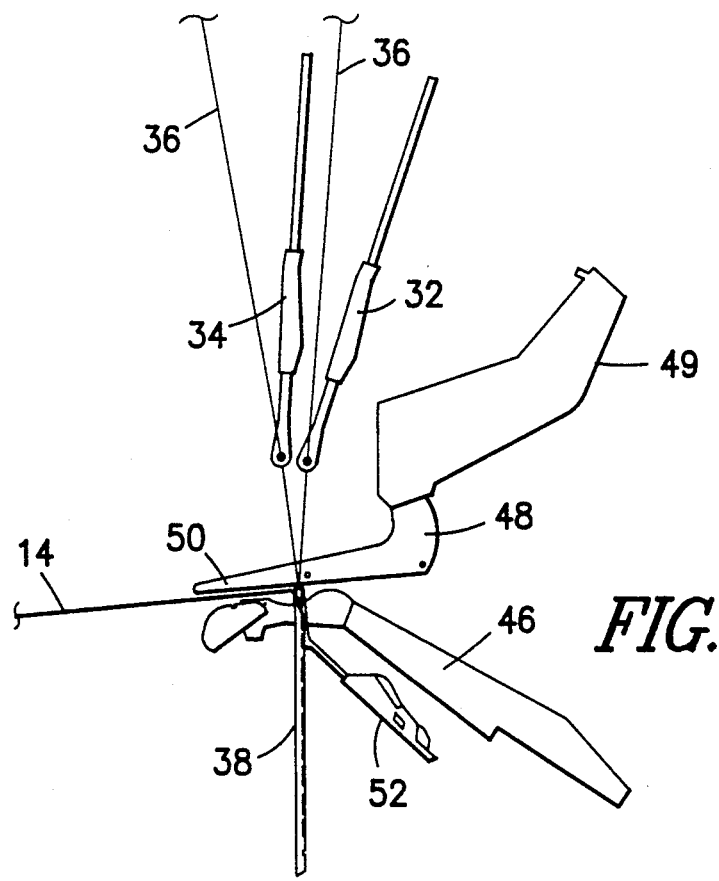
FIG. -10-

TRICOT KNITTING MACHINE IMPROVEMENT

Pressure sensitive tapes are well known in the commercial world but have had disadvantages due to strength, cost and tearability in use. Most such tapes have employed woven fabrics as the carrier fabric placed between the backing material and the pressure sensitive adhesive. Other tapes have employed warp knit, weft inserted substrates but such tapes are fairly expensive due to the excessive insertion of weft yarns which are not necessary to provide an efficient pressure sensitive tape.

It is, therefore, an object of the invention to provide a method of knitting a weft inserted fabric on a tricot knitting machine which provides the desired substrate fabric with a minimum number of weft inserted yarns.

Other objects and advantages of the invention will become readily apparent as the specification proceeds to describe the invention, with reference to the accompanying drawings, in which:

FIG. 1 is a cross-sectional, schematic view of the new and improved pressure sensitive tape;

FIG. 2 is a top or loop side view of the carrier fabric used in the tape of FIG. 1;

FIG. 3 is a schematic view of the method of fabricating the tape of FIG. 1;

FIG. 4 is a schematic side view of a typical tricot knitting machine modified in accordance with the invention;

FIG. 5 is a top view of the knit fabric hold-down bar employed on the modified tricot knitting machine; and FIGS. 6-10 show consecutive positions of a tricot knitting machine during a knitting cycle.

As is well known in the trade, the pressure sensitive tape 10 will by manufactured in wide widths and then cut to the desired width for the desired use. As shown in FIG. 1, the tape 10 consists of a base layer of a three millimeter polyethylene film 12, a carrier layer of a warp knit, weft insertion fabric 14 and a layer of a pressure sensitive adhesive 16.

The carrier fabric 14, illustrated in FIG. 2, is a warp knit, weft insertion fabric with a chain stitch 18 knit, base construction using a 40 denier, continuous filament, polyester yarn while the weft inserted yarn 20 is a 150 denier, textured, polyester continuous filament yarn to provide a 100% synthetic carrier fabric.

The fabric from which the tape 10 is slit is produced in the manner shown in FIG. 3. As shown in FIG. 3, the carrier fabric 14 is supplied from a supply roll 21 and mates with the polyethylene film 12 from the supply roll 22 at the nip of the calender rolls 24 and 26. Calender roll 24 is supplied, by kiss roll 28, a rubber gum pressure sensitive adhesive which is pressed into and through the fabric 14 to laminate the fabric 14 to the base film 12 to provide the pressure sensitive tape 10 when allowed to set after passing through the nip of calender rolls 24 and 26. The completed tape is then taken up on take-up roll 30. The rubber gum adhesive is any of the so-called commercially available pressure sensitive adhesives. The carrier fabric 14 is knit on a tricot knitting machine so designed to allow the insertion of only 5-12 picks per inch, preferably 9, without constant stopping of the knitting machine to correct the position of the fabric being knit due to tearing or rippling of the fabric as it comes off the needles in its passage to the take-up roll.

Looking now to FIG. 4, a typical tricot machine arrangement is shown wherein a plurality of pairs of guide bars 32, 34 are supplying warp yarns 36 to a row of needles 38 to form the knit fabric 14 which is supplied outwardly from the needles and sequentially over the driven roll 40, idler roll 42 and driven roll 44 to the supply roll 21 (not shown). For reasons hereinafter explained the sinker bar 46 is set in a fixed position and a fabric hold-down bar 48 is added so that its fingers 50 press down on the newly formed loops as they are formed to prevent them from breaking out as they are released from the needle 38. As shown in FIG. 5, the fabric hold-down bar 48 consists of a plurality of blocks interconnected and held in place by suitable screws 51 adjacent one another to provide hold down of the fabric loops all the way across the knitting machine. In conventional manner, the weft yarn 20 is inserted while the yarn loops are being formed.

As discussed previously the main purpose of the invention is to provide a tricot knitting machine which produces a weft inserted fabric having a minimum number of weft yarns in order to keep the price of the fabric at a minimum. In order to perform this function it is necessary to provide a means to prevent the loops in the fabric from breaking out after they are released from the needles since there are only a minimum of weft yarns inserted in the fabric to provide transverse strength thereto as the fabric is being drawn outwardly from the knitting machine by the roll 40. As shown in FIGS. 5-10, the new and improved tricot machine will be explained.

In the description of FIGS. 6-10, the hold-down bar 48 shown in FIG. 5 is employed to hold down the last three or four courses of loops of the fabric 14 knit and cast off of the needles 38. In FIG. 6, the hook 54 has engaged the yarn 36 in the guide bars and pulled it into a loop 56 down through the previously formed loop on the fixed sender bar. In conventional manner, the fill yarns 20 have been laid in on the back side of the needles 38 and are not shown in FIGS. 6-10 since insertion of same is well known in the art. In FIG. 7, the knit fabric is pulled away from the needles 38 by the drive roll 40 and the needle 38 has moved upwardly through the loop 56 while the fingers 50 maintain a downward pressure on the fabric 14. Then the guide bars 32, 34 are swung through and around the needles and back again to form another loop 58 in the hook or eye 54 (FIGS. 8 and 9) of the needle 38. The the needles 38 are retracted as in FIG. 2 to allow the loop 56 to be knocked over or cast off as the needle drops down and the closing wire engages the hook or eye 54 to keep the newly formed loop in position until the action is started over again as in FIG. 6. It should be noted that during this whole opertion the sinker bar 46 remains fixed and the hold-down bar 48 maintains the fingers 50 on the previously formed loops to prevent them from breaking out after being cast off the needle. This control of the newly formed loops on the tricot machine allows the reduction of the number of weft yarns needed to maintain the integrity of the knit fabric 14.

It can be seen that the herein-described knitting machine and method provide a substrate fabric that requires a minimal number of inserted fill yarns to provide integrity since the fabric hold-down bar prevents the loops in the last three or four courses of fabric from breaking out causing defective fabric and/or machine down time. As indicated before, the preferred use of the resultant substrate fabric is as a carrier fabric for a pressure sensitive tape which can be employed for many uses such as dust tape, carton strapping tape, etc.

The resultant tape made from the above method provides a tape that is light-weight and, because of the open construction of the carrier fabric 14, provides a tape on which the adhesive is more evenly distributed. Furthermore, as compared to prior art tapes, the warp knit, weft insertion carrier fabric allows more even distribution of the pressure senstive adhesive with the application of less adhesive. Also, the resultant fabric is of lighter gauge and can be readily torn from the roll.

Although the specific tape has been described, it is contemplated that changes may be made without departing from the scope or spirit of the invention, and I desire to be limited only by the scope of the claims.

I claim:

1. A pressure sensitive tape comprising: a layer of plastic film, a layer of warp knit, weft inserted, all synthetic fabric laminated to said film and a pressure sensitive adhesive adjacent to said fabric and connected to said fabric and said film, said weft inserted fabric having 5-12 weft yarns inserted per inch.

2. The tape of claim 1 wherein said film is polyethylene.

3. The tape of claim 1 wherein said synthetic yarns are polyester.

4. The tape of claim 1 wherein 9 weft yarns are inserted per inch of knit fabric.

* * * * *